(12) United States Patent
Ducharlet et al.

(10) Patent No.: US 10,301,225 B2
(45) Date of Patent: May 28, 2019

(54) PROCESS FOR MANUFACTURING A MULTIPERFORATED COMPOSITE PART

(71) Applicant: HERAKLES, Le Haillan (FR)

(72) Inventors: Pascal Ducharlet, Saint-Médard-en-Jalles (FR); Xavier Martin, Beuste (FR); Jocelin Laborde, Sauvagnon (FR)

(73) Assignee: SAFRAN CERAMICS, Le Haillan (FR)

( * ) Notice: Subject to any disclaimer, the term of this patent is extended or adjusted under 35 U.S.C. 154(b) by 232 days.

(21) Appl. No.: 15/303,302

(22) PCT Filed: Apr. 2, 2015

(86) PCT No.: PCT/FR2015/050859
§ 371 (c)(1),
(2) Date: Oct. 11, 2016

(87) PCT Pub. No.: WO2015/155445
PCT Pub. Date: Oct. 15, 2015

(65) Prior Publication Data
US 2017/0036964 A1    Feb. 9, 2017

(30) Foreign Application Priority Data
Apr. 11, 2014 (FR) .................................... 14 53250

(51) Int. Cl.
*C08K 7/08* (2006.01)
*C04B 35/80* (2006.01)
(Continued)

(52) U.S. Cl.
CPC ............ *C04B 41/91* (2013.01); *C04B 35/565* (2013.01); *C04B 35/62863* (2013.01);
(Continued)

(58) Field of Classification Search
CPC ................................ B28B 7/342; C04B 41/91
(Continued)

(56) References Cited

U.S. PATENT DOCUMENTS 7,238,247 B2 *   7/2007   Bouillon .................... B28B 1/44
                                                    156/148
9,080,454 B2 *   7/2015   Coupe ..................... B29C 70/222
(Continued)

FOREIGN PATENT DOCUMENTS

FR     2 852 003 A1    9/2004
FR     2 852 004 A1    9/2004
(Continued)

OTHER PUBLICATIONS

Dave Hansel. "Abrasive Blasting Systems." Metal Finishing: vol. 97, Issue 5, Supplement 1. Available Jul. 7, 1999 (Year: 1999).*
(Continued)

*Primary Examiner* — Matthew J Daniels
*Assistant Examiner* — Hana C Page
(74) *Attorney, Agent, or Firm* — Pillsbury Winthrop Shaw Pittman LLP

(57) ABSTRACT

A method of fabricating a multi-perforated part out of composite material includes positioning a sand-blasting mask on a preform including a fiber texture impregnated with a polymerized ceramic-precursor resin, the mask having a plurality of openings corresponding to the perforations to be made in the preform; projecting abrasive particles at high speed against the surface of the mask so as to perforate the preform exposed in the openings of the mask; and pyrolyzing the multi-perforated preform so as to form a ceramic matrix in the multi-perforated fiber texture.

8 Claims, 2 Drawing Sheets

(51) Int. Cl.
*C04B 35/83* (2006.01)
*C04B 38/00* (2006.01)
*C04B 38/06* (2006.01)
*C04B 41/91* (2006.01)
*C04B 35/565* (2006.01)
*C04B 35/628* (2006.01)

(52) U.S. Cl.
CPC .. *C04B 35/62873* (2013.01); *C04B 35/62884* (2013.01); *C04B 35/806* (2013.01); *C04B 38/0003* (2013.01); *C08K 7/08* (2013.01); C04B 2235/3826 (2013.01); C04B 2235/422 (2013.01); C04B 2235/522 (2013.01); C04B 2235/612 (2013.01); C04B 2235/614 (2013.01); C04B 2235/945 (2013.01)

(58) Field of Classification Search
USPC .................................................. 264/628, 154
See application file for complete search history.

(56) References Cited

U.S. PATENT DOCUMENTS

2003/0034122 A1* 2/2003 Asai .......................... B24C 1/04
156/252

2007/0196693 A1* 8/2007 Steibel ..................... F01D 5/282
428/698

FOREIGN PATENT DOCUMENTS

FR        2 939 129 A1    6/2010
FR        2 989 390 A1   10/2013
WO     WO 02/18075 A1    3/2002

OTHER PUBLICATIONS

C. Hu et. al.. "Developments in hot pressing (HP) and hot isostatic pressing (HIP) of ceramic matrix composites." *Advances in Ceramic Matrix Composites*. Available Feb. 25, 2014.*
Ramulu, M., Jenkins, M. G., and Guo, Z., "Abrasive Water Jet Machining Mechanisms in Continuous-Fiber Ceramic Composites," Journal of Composites Technology & Research, JCTRER, vol. 23, No. 2, Apr. 2001, pp. 82-91. (Year: 2001).*
International Preliminary Report on Patentability and the Written Opinion of the International Searching Authority as issued in International Patent Application No. PCT/FR2015/050859, dated Oct. 12, 2016.
International Search Report as issued in International Patent Application No. PCT/FR2015/050859, dated Jun. 9, 2015.

* cited by examiner

PROCESS FOR MANUFACTURING A MULTIPERFORATED COMPOSITE PART

CROSS-REFERENCE TO RELATED APPLICATIONS

This application is the U.S. National Stage of PCT/FR2015/050859, filed Apr. 2, 2015, which in turn claims priority to French Patent Appication No. 1453250 filed Apr. 11, 2014, the entire contents of all applications are incorporated herein by reference in their entireties.

BACKGROUND OF THE INVENTION

The present invention relates to fabricating multi-perforated parts out of composite material, i.e. parts made of fiber reinforcement densified by a matrix and in which a plurality of perforations have been made.

Multi-perforated parts made out of composite material find particular applications specifically in the fields of filtering and acoustics. For composite material parts having acoustic functions, it is common practice to make perforations therein, as applies for example to the skins of acoustic attenuation panels that are present in aeroengines. In order to enable soundwaves to penetrate into the insides of such panels and be attenuated, the skins of the panels need to present a plurality of perforations.

For parts made out of ceramic matrix composite (CMC) material, the parts need to be made by impregnating a fiber texture that is to form the reinforcement of the part with a resin that is a precursor of a ceramic, by polymerizing the resin, and by proceeding to pyrolize the impregnated texture in order to form a ceramic matrix therein.

Perforations may be made in various ways in a part that is made of CMC material. In particular, they may be made by drilling the impregnated texture while it is in the polymerized stage using a drill bit. Nevertheless, the machining needs to be performed without lubrication in order to avoid degrading the material present in the impregnated texture (chemical incompatibility). That leads to premature wear of the drill bit. In addition, the cutting is not perfect and allows fibrils to appear in the perforations, which fibrils lead to subsequent problems in the fabrication of the part.

The perforations may also be made by using a laser to drill the impregnated texture at the polymerized stage. Under such circumstances, the texture is cut cleanly (no fibrils), but thermally affected zones (TAZ) appear in the texture.

Another solution consists in placing the resin-impregnated texture on a board having surface spikes and then polymerizing the resin. Nevertheless, such tooling is very expensive and sometimes difficult to use.

Composite material parts to which the present invention applies can also be made out of CMC material of the oxide/oxide type, i.e. by depositing refractory oxide particles within a fiber texture made of oxide fibers and then sintering the particles so as to form a refractory oxide matrix in the texture.

The above-mentioned drawbacks of the techniques for making perforations occur likewise when making perforations in a fiber texture containing refractory oxide particles.

Consequently, there exists a need for a solution that makes it possible to make multiple perforations in a composite material part and to do so while complying with the shapes defined for the perforations (no fibrils) and at a production cost that is as low as possible.

OBJECT AND SUMMARY OF THE INVENTION

To this end, the present invention proposes a method of fabricating a multi-perforated part out of composite material, the method comprising the following steps:
positioning a sand-blasting mask on a preform comprising a fiber texture impregnated with a polymerized ceramic-precursor resin, said mask having a plurality of openings corresponding to the perforations to be made in the preform;
projecting abrasive particles at high speed (sand-blasting) against the surface of the mask so as to perforate the preform exposed in said openings of said mask; and
pyrolyzing the multi-perforated preform so as to form a ceramic matrix in the multi-perforated fiber texture.

Thus, using the sand-blasting technique enables multi-perforated parts to be made out of composite material in a manner that is accurate and inexpensive. Nevertheless, in accordance with the invention, the perforations are made at an intermediate stage in the fabrication of the part, i.e. after polymerization and before transformation of the resin into ceramic by pyrolysis. Specifically, after it has been pyrolized, the composite material of the part presents great hardness, thereby requiring sand-blasting to be performed over long periods and/or with large forces. Under such circumstances, there are considerable risks of damaging the sand-blasting mask, which means that the shape defined for the perforations cannot be guaranteed.

The invention also provides a method of fabricating a multi-perforated part out of composite material, the method comprising the following steps:
positioning a sand-blasting mask on a preform comprising a fiber texture containing refractory oxide particles, said mask including a plurality of openings corresponding to the perforations to be made in the preform;
projecting abrasive particles at high speed (sand-blasting) against the surface of the mask so as to perforate the preform exposed in the openings of said mask; and
sintering the refractory oxide particles so as to form a refractory oxide matrix in the multi-perforated preform.

As above, the perforations are made at an intermediate stage in the fabrication of the composite material part, i.e. before sintering the oxide particles and while the part still presents a level of hardness that is compatible with sand-blasting taking place over a duration and/or with a force that enables the integrity of the sand-blasting mask to be preserved.

In a particular aspect of the methods of the invention, after the pyrolysis or sintering step, these methods include a step of densifying the multi-perforated fiber texture, which step is performed by chemical vapor infiltration of silicon carbide. In addition to finishing off the densification of the part, this step makes it possible to form a silicon carbide coating that protects the material of the part that has been laid bare inside the perforations.

According to a characteristic of the invention, the abrasive particles are projected against the surface of the sand-blasting mask at an angle lying in the range 45° to 60°. This makes it possible to increase the efficiency of the sand-blasting and to shorten its duration.

BRIEF DESCRIPTION OF THE DRAWINGS

Other characteristics and advantages of the invention appear from the following description of particular embodiments of the invention, given as non-limiting examples and with reference to the accompanying drawings, in which.

DETAILED DESCRIPTION OF AN IMPLEMENTATION

The method of the invention relates to fabricating parts out of ceramic matrix composite (CMC) material, i.e. parts having reinforcement made of refractory fibers (carbon fibers or ceramic fibers) that are densified with a matrix that is as at least partially ceramic. Examples of CMC materials are C/SiC composites (carbon fiber reinforcement and silicon carbide matrix), C/C—SiC composites (carbon fiber reinforcement with a matrix comprising both a carbon phase, generally closer to the fibers, and also a silicon carbide phase), SiC/SiC composites (reinforcing fibers and matrix made of silicon carbide), and oxide/oxide composites (reinforcing fibers and matrix made of alumina). An interphase layer may be interposed between the reinforcing fibers and the matrix in order to improve the mechanical strength of the material.

In accordance with the present invention, perforations are made by sand-blasting at an intermediate stage in the fabrication of a CMC material part. More precisely, when the matrix of the CMC material of the part is formed at least in part using a ceramic precursor resin, the sand-blasting operation can be performed at the stage when the resin is polymerized, i.e. before it is pyrolized in order to transform the precursor into ceramic. When the matrix is made of refractory oxide particles, as in a CMC material of oxide/oxide type, the sand-blasting is performed before sintering the particles that are to form the refractory oxide matrix.

Figure 5:
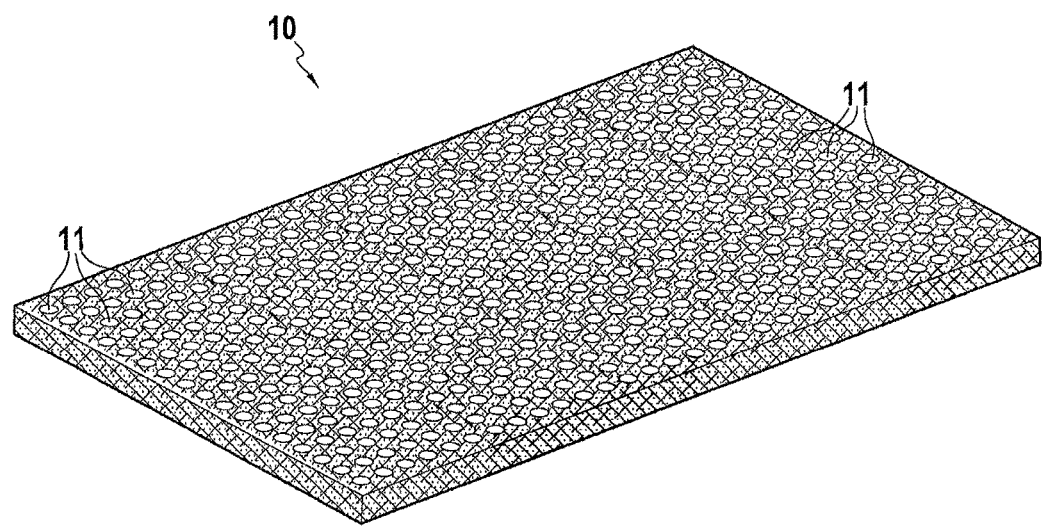
FIG. 5 is a perspective view of a multi-perforated part made of ceramic matrix composite material in an implementation of the invention.

FIG. 5 shows an acoustic skin 10 made of CMC material that includes a multitude of perforations 11. By way of example, the acoustic skin 10 is for assembling with a cellular structure in order to form an acoustic attenuation panel.

Figure 1:
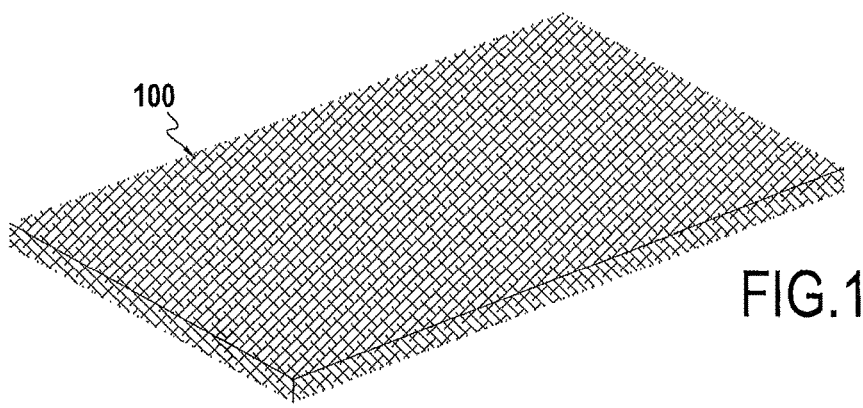
FIG. 1 is a diagrammatic perspective view of a fiber structure used for making a multi-perforated part in accordance with an implementation of the invention.

Fabrication of the acoustic panel begins by making a fiber texture 100 out of refractory fibers, e.g. out of carbon, ceramic, or oxide fibers, as shown in FIG. 1.

The fiber texture used may be of various kinds and shapes, including in particular:

two-dimensional (2D) fabric;
three-dimensional (3D) fabric obtained by 3D or multi-layer weaving, in particular as described in Document WO 2010/061140;
a braid;
a knit;
a felt;
a unidirectional (UD) sheet of yarns or tows or multi-directional (nD) sheets obtained by superposing a plurality of UD sheets in different directions and bonding the UD sheets together, e.g. by stitching, by using a chemical bonding agent, or by needling.

It is also possible to use a fiber structure made up of a plurality of superposed layers of fabric, braid, knit, felt, sheets, tows, etc., which layers are bonded together, e.g. by stitching, by implanting yarns or rigid elements, or by needling.

When forming a ceramic matrix from a liquid precursor of the matrix, the fiber texture is immersed in a bath containing a resin, usually together with a solvent for the resin. Other known impregnation techniques could be used, such as passing the fiber texture through a continuous impregnator, impregnation by infusion, or indeed impregnation by resin transfer molding (RTM).

The organic precursor is usually in the form of a polymer, such as a resin, possibly diluted in a solvent. By way of example, liquid precursors for ceramics, and in particular for SiC, may be resins of the polycarbosilane (PCS) type, of the polysiloxane (PSX) type, of the polytitanocarbosilane (PTCS) type, or of the polysilazane (PSZ) type.

After the fiber texture has been impregnated and possibly dried, the resin is polymerized, thereby consolidating the fiber texture.

When forming an oxide type matrix, refractory oxide particles are deposited in the fiber structure. One known technique for such deposition consists in:

placing a slip on one side of the texture, which slip contains a submicrometer powder of refractory oxide particles;
establishing a pressure difference in order to force the slip to pass through the preform; and
filtering the liquid that has passed through the preform in order to retain the refractory oxide particles within the preform.

Figure 2:
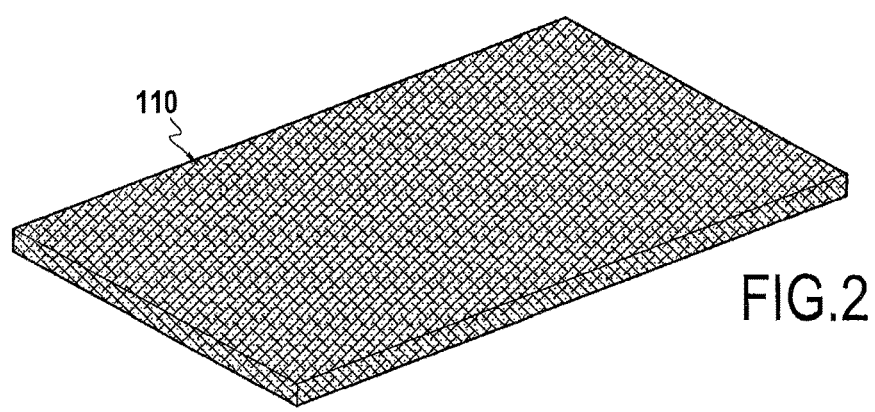
FIG. 2 is a diagrammatic perspective view of a preform obtained using the FIG. 1 fiber structure.

In accordance with the invention, the perforations are made at this intermediate stage in the fabrication of the part, i.e. at the stage when there is a preform 110 corresponding to the texture 100 after the resin has been polymerized or after refractory oxide particles have been deposited therein (FIG. 2).

In accordance with the invention, the perforations are made by sand-blasting, i.e. by projecting abrasive particles at high speed against the preform 110.

Figure 3:
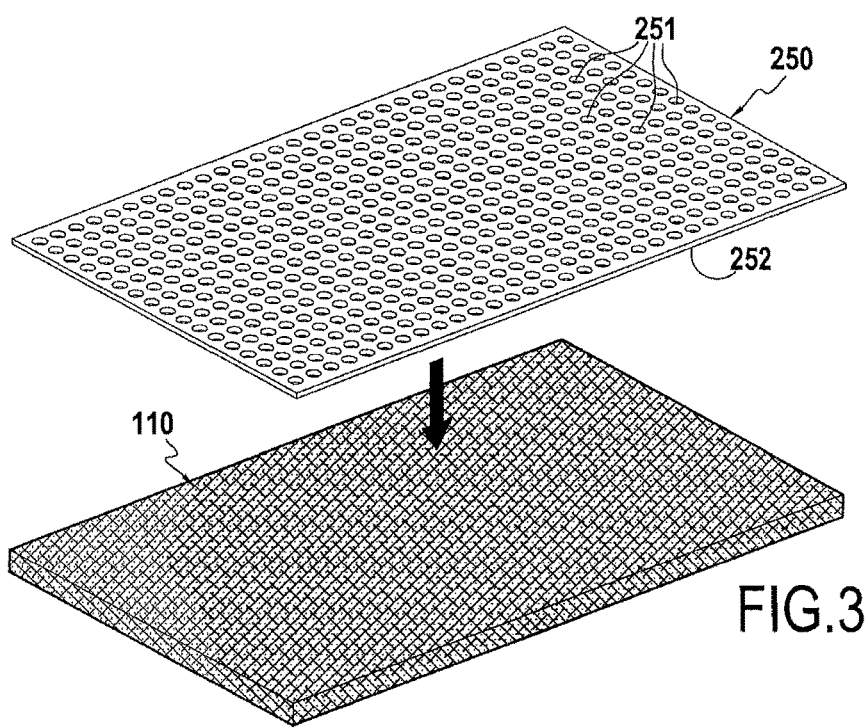
FIG. 3 is a diagrammatic perspective view showing a sand-blasting mask being positioned on the FIG. 2 preform.

Prior to the sand-blasting operation, a sand-blasting mask or stencil 250 is positioned on the surface of the preform 100, as shown in FIG. 3. The sand-blasting mask 250 has a plurality of openings 251 corresponding to the perforations that are to be made in the preform 110. The mask 250 is made out of a flexible material in order to withstand the projected abrasive particles and in order to adapt to preforms of any shape, and in particular to preforms presenting shapes that are curved. By way of example, the mask 250 may be made of an elastomer that includes an adhesive on its surface 252 that is to come into contact with the preform, which adhesive serves to ensure the mask is held in position.

Figure 4:
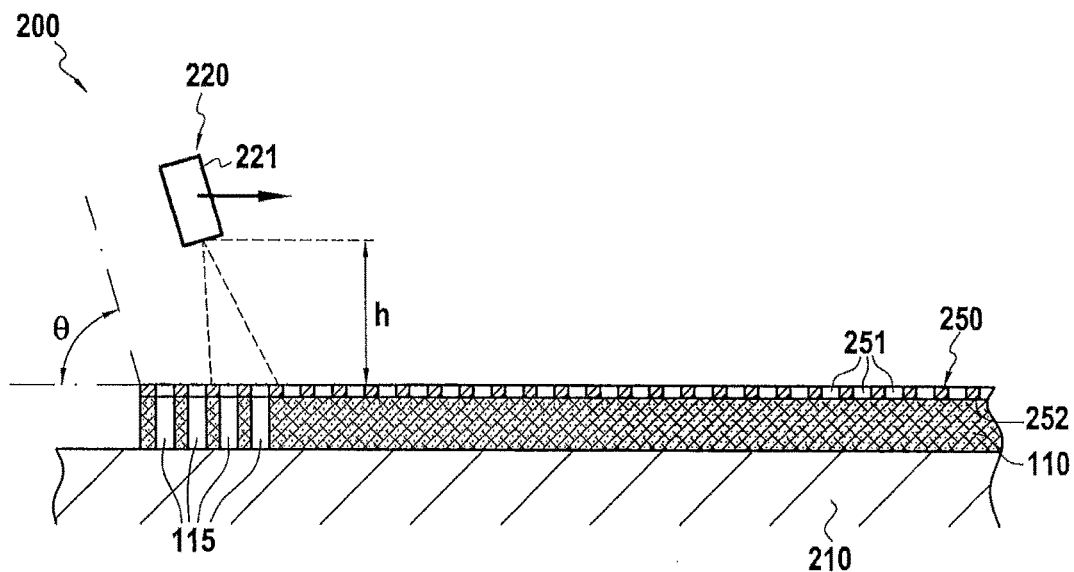
FIG. 4 is a diagrammatic section view of a sand-blasting machine used for making perforations in the FIG. 2 preform.

As shown in FIG. 4, the preform 110 covered in the mask 250 is placed on the support 210 of a sand-blasting machine 200 that also has a sand-blasting head 220 with a nozzle 221 from which abrasive particles are projected at high speed in order to form perforations 115 in the preform 110. The sand-blasting head 220 is adjustable in height in order to adjust the distance h between the nozzle 221 and the surface of the preform for sand-blasting (ignoring the thickness of the sand-blasting mask). The sand-blasting head is also tiltable in order to adjust the angle θ at which the particles are projected against the texture.

Abrasive particles suitable for use in perforating a preform corresponding to a fiber texture impregnated with a polymerized ceramic precursor resin may for example be grains of silicon carbide having an angular shape with sharp edges and presenting a grain size close to 100 micrometers (μm). In order to perforate a preform corresponding to a fiber texture containing refractory oxide particles, it is possible to use abrasive particles such as grains of white corundum (99.6% pure crystallized anhydrous alumina oxide) or silicon carbide of angular structure with sharp edges and having a grain size close to 100 μm.

The projection distance, i.e. the distance between the outlet from the nozzle and the preform for sand-blasting is adjusted as a function of the pressure at which the particles are projected at the outlet from the nozzle. More precisely, for a determined nozzle outlet pressure, the projection distance is adjusted so as to optimize the perforation speed while taking care not to attack the mask. By way of example, with a nozzle projecting abrasive particles at a pressure of 7 bars, the projecting distance may lie in the range 90 millimeters (mm) to 150 mm. The projection distance corresponds to the height h when the projection angle θ is 90°. The projection distance is greater than the height h when the projection angle θ less than 90°.

Concerning the projection angle θ, i.e. the angle at which the abrasive particles impact the preform, although it is possible to use a projection angle of 90°, it has been found that perforations are made in most effective and economic manner while using a projection angle lying in the range 45° to 60°. Specifically, projection at 90° does indeed lead to a greater intensity of impact, but efficiency is reduced because of the large amount of particles ricocheting after impact and forming a screen that destroys incident particles by collision.

Once all of the perforations have been made, the sand-blasting mask is removed and the acoustic skin 10 of FIG. 5 is obtained, which corresponds to a multi-perforated part made of CMC material, i.e. a part constituted by refractory fiber reinforcement densified by a matrix that is made at least in part out of ceramic (silicon carbide, oxide, etc.).

After the sand-blasting operation, the part may be subjected to chemical vapor infiltration (CVI) of silicon carbide that serves not only to finalize densification of the preform, but also to form a coating of silicon carbide (a "sealcoat") that protects the portions of the part that have been laid bare in the perforations. In known manner, the part is placed in an oven into which a reaction gas is admitted. The pressure and the temperature that exist inside the oven and the composition of the reaction gas are selected so as to enable the gas to diffuse within the residual pores and into the surfaces of parts in order to form therein a matrix by depositing a solid material that results either from one of the constituents of the gas decomposing or else from a reaction between a plurality of its constituents. By way of example, gaseous precursors of ceramic, and in particular of SiC, may be methyltrichlorosilane (MTS), which gives SiC by the MTS decomposing (possibly in the presence of hydrogen).

The invention claimed is:

1. A method of fabricating a multi-perforated part out of composite material, the method comprising the following steps:
   positioning a sand-blasting mask on a preform comprising a fiber texture impregnated with a polymerized ceramic-precursor resin, said sand-blasting mask having a plurality of openings corresponding to perforations to be made in the preform;
   projecting abrasive particles at high speed against the surface of the sand-blasting mask so as to perforate the preform exposed in said openings of said sand-blasting mask; and
   pyrolyzing the multi-perforated preform so as to form a ceramic matrix in the multi-perforated fiber texture.

2. A method according to claim 1, wherein after heat treatment of the pyrolyzing step the method includes a step of densifying the multi-perforated preform, performed by chemical vapor infiltration of silicon carbide.

3. A method according to claim 1, wherein the abrasive particles are grains of silicon carbide of angular shape with sharp edges.

4. A method according to claim 1, wherein the abrasive particles are projected against the surface of the sand-blasting mask at an angle lying in the range 45° to 60°.

5. A method of fabricating a multi-perforated part out of composite material, the method comprising the following steps:
   placing a sand-blasting mask on a preform comprising a fiber texture containing refractory oxide particles, said sand-blasting mask including a plurality of openings corresponding to perforations to be made in the preform;
   projecting abrasive particles at high speed against the surface of the sand-blasting mask so as to perforate the preform exposed in the openings of said sand-blasting mask; and
   sintering the refractory oxide particles so as to form a refractory oxide matrix in the multi-perforated preform.

6. A method according to claim 5, wherein after heat treatment of the sintering step the method includes a step of densifying the multi-perforated preform, performed by chemical vapor infiltration of silicon carbide.

7. A method according to claim 5, wherein the abrasive particles are grains of white corundum or of silicon carbide of angular shape with sharp edges.

8. A method according to claim 5, wherein the abrasive particles are projected against the surface of the sand-blasting mask at an angle lying in the range 45° to 60°.

* * * * *